(12) United States Patent  
Kemppinen

(10) Patent No.: US 7,764,977 B2  
(45) Date of Patent: Jul. 27, 2010

(54) MEMORY CARD REMOVAL GUARD

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 964 days.

(21) Appl. No.: 11/420,062

(22) Filed: May 24, 2006

(65) Prior Publication Data

US 2007/0275759 A1    Nov. 29, 2007

(51) Int. Cl.
*H04B 1/38* (2006.01)

(52) U.S. Cl. .............. 455/558; 455/90.1; 455/90.2; 455/90.3; 455/403; 455/407; 455/550.1; 439/630; 235/461

(58) Field of Classification Search ............. 455/558
See application file for complete search history.

(56) References Cited

U.S. PATENT DOCUMENTS

| | | | | |
|---|---|---|---|---|
| 3,857,018 A * | 12/1974 | Stark et al. | ............ | 235/382 |
| 5,410,141 A * | 4/1995 | Koenck et al. | ........ | 235/472.02 |
| 5,790,659 A * | 8/1998 | Strand | .......... | 379/433.09 |
| 5,879,173 A * | 3/1999 | Poplawski et al. | .......... | 439/138 |
| 5,883,786 A * | 3/1999 | Nixon | .......... | 361/737 |
| 5,937,359 A * | 8/1999 | Jubert | .......... | 455/558 |
| 5,960,332 A * | 9/1999 | Michalzik | .......... | 455/575.1 |
| 6,009,315 A * | 12/1999 | De Larminat et al. | ....... | 455/558 |
| 6,062,887 A * | 5/2000 | Schuster et al. | .......... | 439/218 |
| 6,101,372 A * | 8/2000 | Kubo | .......... | 455/558 |
| 6,267,606 B1 * | 7/2001 | Poplawski et al. | .......... | 439/92 |
| 6,370,362 B1 * | 4/2002 | Hansen et al. | .......... | 455/90.1 |
| 6,397,081 B1 * | 5/2002 | Franck et al. | .......... | 455/558 |
| 6,411,822 B1 * | 6/2002 | Kraft | .......... | 455/558 |
| 6,766,952 B2 * | 7/2004 | Luu | .......... | 235/451 |
| 6,802,742 B2 * | 10/2004 | Chaillie | .......... | 439/630 |
| 6,842,335 B1 * | 1/2005 | Hanson et al. | .......... | 361/683 |
| 6,892,078 B2 * | 5/2005 | Sakaguchi et al. | .......... | 455/558 |
| 6,954,653 B2 * | 10/2005 | Morita | .......... | 455/550.1 |
| 6,987,975 B1 * | 1/2006 | Irvin et al. | .......... | 455/456.1 |
| 7,066,392 B1 * | 6/2006 | Liang | .......... | 235/486 |
| 7,090,509 B1 * | 8/2006 | Gilliland et al. | .......... | 439/76.1 |
| 7,154,746 B1 * | 12/2006 | Hanson et al. | .......... | 361/683 |
| 7,155,199 B2 * | 12/2006 | Zalewski et al. | .......... | 455/403 |
| 7,213,766 B2 * | 5/2007 | Ryan et al. | .......... | 235/492 |
| 7,221,961 B1 * | 5/2007 | Fukumoto et al. | .......... | 455/557 |
| 7,364,436 B2 * | 4/2008 | Yen | .......... | 439/76.1 |
| 7,388,742 B2 * | 6/2008 | Cargin et al. | .......... | 361/679 |
| 7,389,126 B2 * | 6/2008 | Okada | .......... | 455/558 |
| 7,426,595 B2 * | 9/2008 | Osaka | .......... | 710/304 |
| 7,435,506 B2 * | 10/2008 | Sakuma et al. | .......... | 429/61 |
| 7,466,993 B2 * | 12/2008 | Atkinson et al. | .......... | 455/557 |

(Continued)

*Primary Examiner*—Duc Nguyen
*Assistant Examiner*—Hai V Nguyen
(74) *Attorney, Agent, or Firm*—Locke Lord Bissell & Liddell LLP

(57) ABSTRACT

A mobile device powered by a battery is provided having a guard member for preventing a memory card from being removed from the mobile device when a battery is inserted in the device. The battery is removably received in a battery compartment and the memory card is removably received in memory card. The memory card slot has an opening in the casing of the mobile device and the guard member is movable from a first position in which it at least partly blocks the opening to a second position in which the memory card can be removed from the memory card slot. The battery compartment for the battery is arranged such that when the battery is inserted, the guard member is moved to the first position.

30 Claims, 6 Drawing Sheets

U.S. PATENT DOCUMENTS

| | | | |
|---|---|---|---|
| 7,536,199 B2* | 5/2009 | Josenhans et al. | 455/550.1 |
| 2001/0016502 A1* | 8/2001 | Shirai | 455/558 |
| 2001/0021657 A1* | 9/2001 | Morita | 455/550 |
| 2002/0039910 A1* | 4/2002 | Malthouse | 455/558 |
| 2002/0052147 A1* | 5/2002 | Sato | 439/630 |
| 2002/0086647 A1* | 7/2002 | Ilvonen | 455/90 |
| 2002/0094841 A1* | 7/2002 | Sakaguchi et al. | 455/558 |
| 2003/0069040 A1* | 4/2003 | Chuang et al. | 455/558 |
| 2003/0085285 A1* | 5/2003 | Luu | 235/486 |
| 2003/0162083 A1* | 8/2003 | Sakuma et al. | 429/61 |
| 2004/0063462 A1* | 4/2004 | Kumazawa et al. | 455/558 |
| 2004/0116155 A1* | 6/2004 | Aisenberg | 455/558 |
| 2004/0127102 A1* | 7/2004 | Poplawski et al. | 439/630 |
| 2004/0204090 A1* | 10/2004 | West et al. | 455/558 |
| 2004/0266480 A1* | 12/2004 | Hjelt et al. | 455/558 |
| 2005/0075138 A1* | 4/2005 | Page et al. | 455/559 |
| 2005/0085226 A1* | 4/2005 | Zalewski et al. | 455/426.1 |
| 2005/0148366 A1* | 7/2005 | Okada | 455/558 |
| 2005/0181821 A1* | 8/2005 | Elomaa | 455/550.1 |
| 2005/0255753 A1* | 11/2005 | Buschmann | 439/630 |
| 2006/0046772 A1* | 3/2006 | Lim | 455/550.1 |
| 2006/0069456 A1* | 3/2006 | Stringer et al. | 700/94 |
| 2006/0079283 A1* | 4/2006 | Kim et al. | 455/558 |
| 2006/0160560 A1* | 7/2006 | Josenhans et al. | 455/550.1 |
| 2006/0283947 A1* | 12/2006 | Yang et al. | 235/441 |
| 2007/0049338 A1* | 3/2007 | He et al. | 455/557 |
| 2007/0202956 A1* | 8/2007 | Ogasawara et al. | 463/46 |
| 2007/0254713 A1* | 11/2007 | Lagnado et al. | 455/558 |
| 2007/0275759 A1* | 11/2007 | Kemppinen | 455/558 |
| 2008/0018780 A1* | 1/2008 | Horiguchi | 348/374 |
| 2008/0082179 A1* | 4/2008 | Yang | 700/17 |
| 2008/0090527 A1* | 4/2008 | Atkinson et al. | 455/70 |
| 2008/0096603 A1* | 4/2008 | Sparre | 455/550.1 |
| 2008/0161051 A1* | 7/2008 | Schobbert et al. | 455/558 |
| 2008/0303888 A1* | 12/2008 | Hansson | 348/14.02 |

* cited by examiner

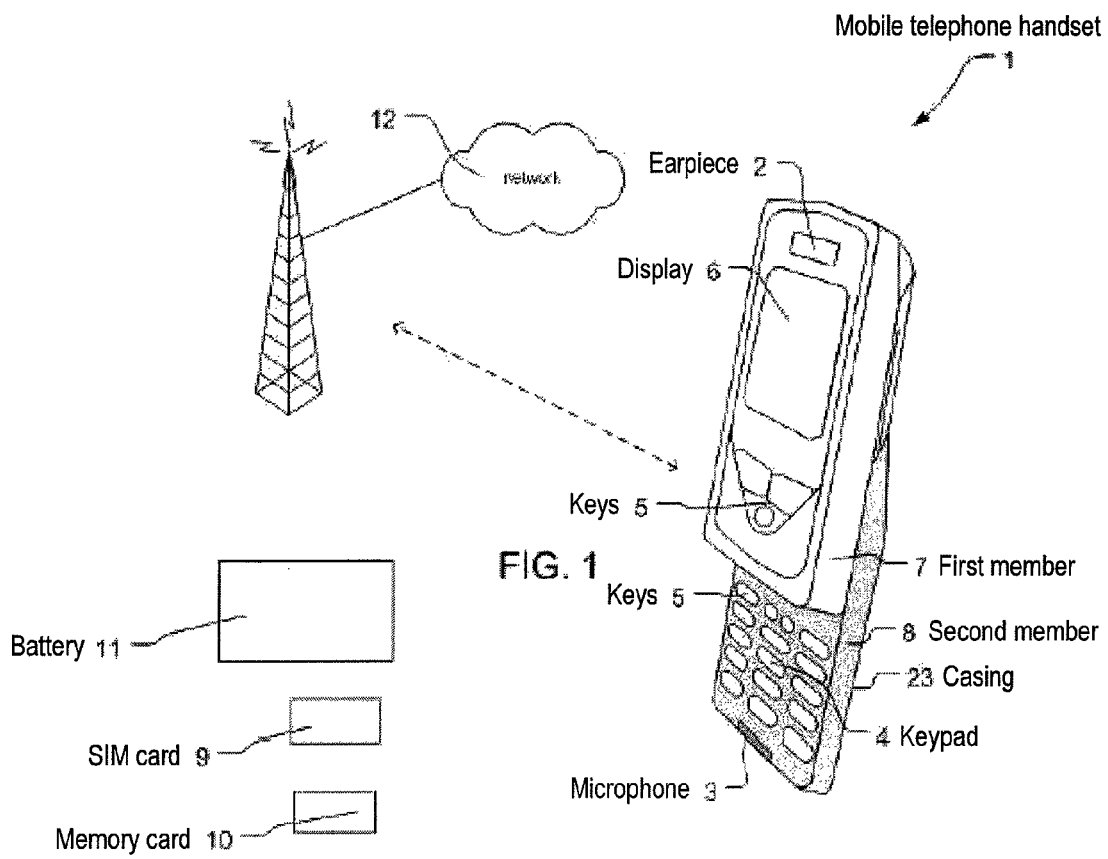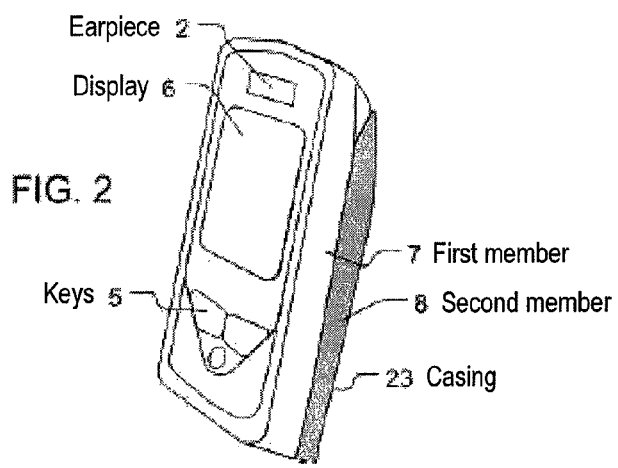

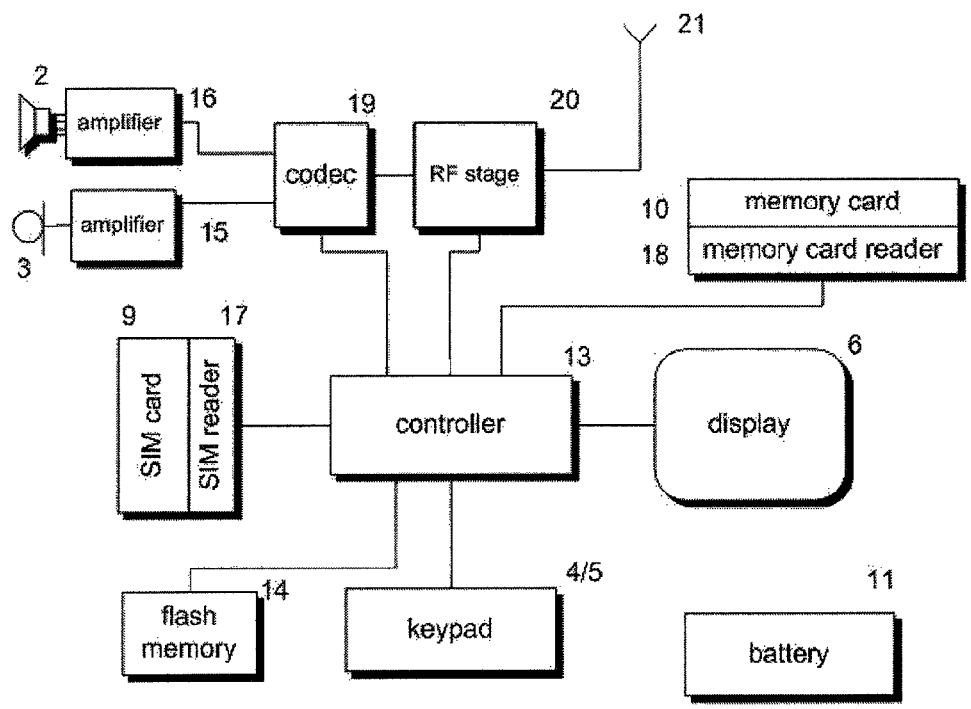
FIG. 3
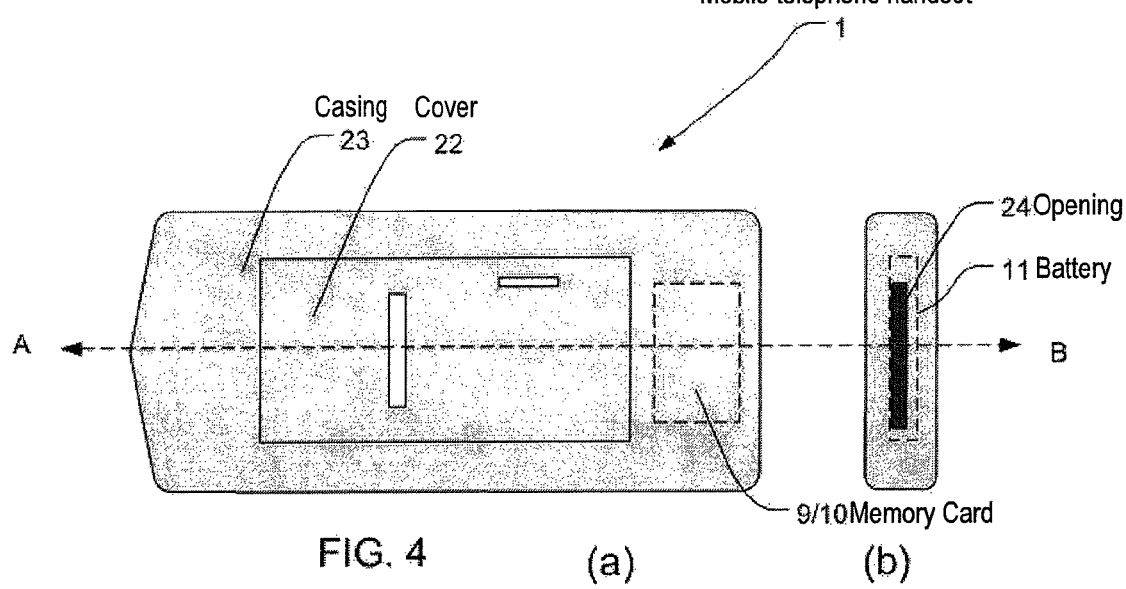
FIG. 4 (a) (b)

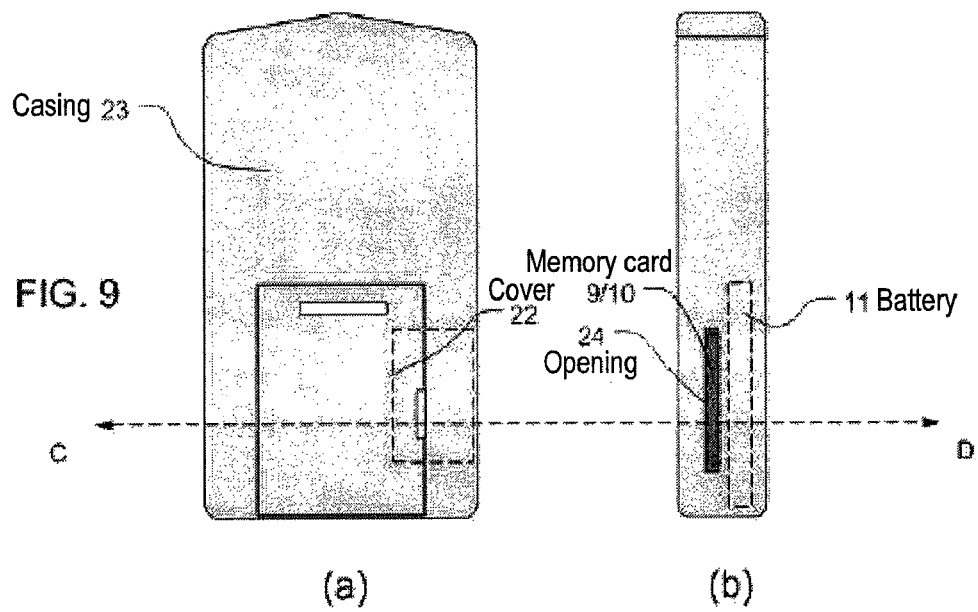
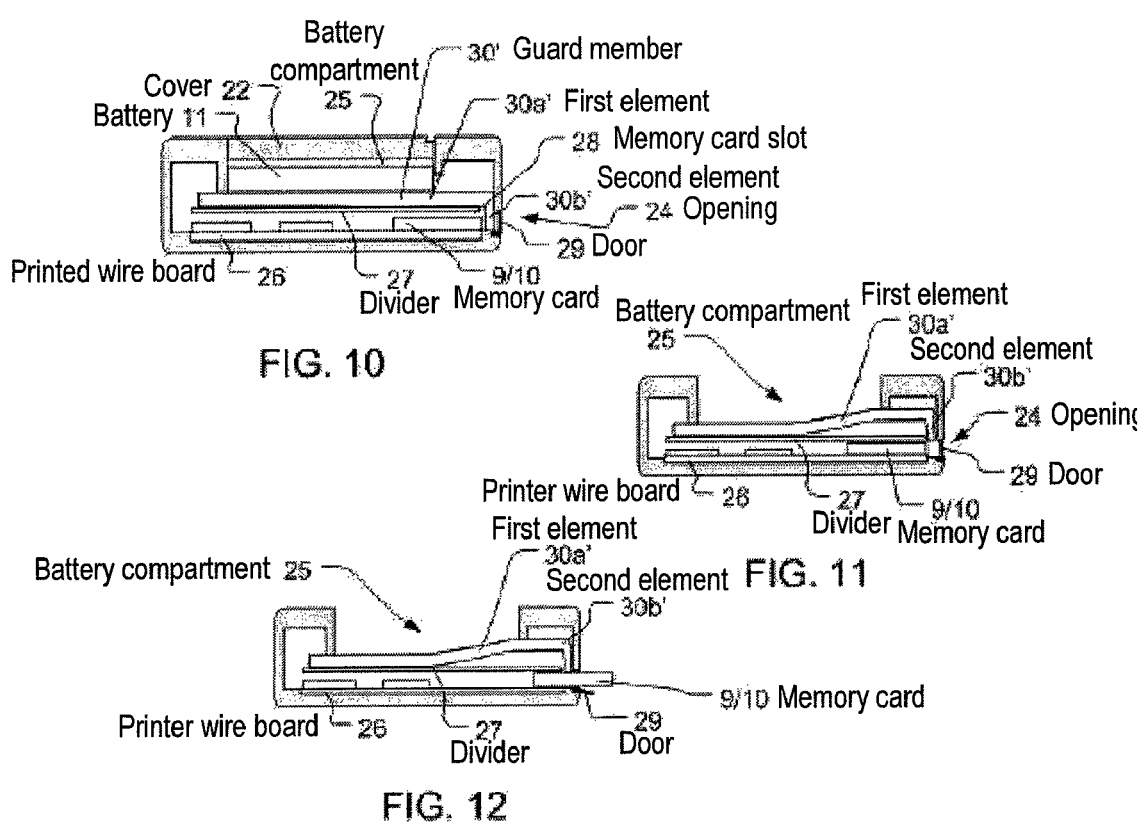

MEMORY CARD REMOVAL GUARD

FIELD OF INVENTION

This invention relates to a mobile device. More particularly, but not exclusively, it relates to a mobile device powered by a battery and having a guard member for preventing the removal of a memory card in the device when the battery is inserted.

BACKGROUND

The design and functionalities of mobile phones are continuously being improved to attract consumers. The trend moves towards incorporating an ever increasing range of features, including for example cameras and music players, and making the phones as slim and attractive as possible. However, new features require additional hardware components whereas slim housings reduce the space available for additional components. Consequently, it is desirable to make as good use of the available space as possible.

In conventional phones, SIM cards are often located under the battery and the opening to the SIM card slot is provided at the base of the battery compartment. The SIM card can only be inserted if the battery is first removed. However, in some slim designs, the overall thickness of the phone can be reduced if the SIM card is provided in the same plane as the battery, in which case the battery does not cover the opening to the SIM card. Moreover, space can be saved, even if the SIM card is located under the battery, by providing the opening to the SIM card slot along the side of the phone. If the battery does not cover the opening to the SIM card slot, the SIM card can be removed even when the phone is still powered by the battery. Removing the SIM card while the phone is on can damage the phone and corrupt the stored data on the SIM card. Consequently, it is desirably to prevent a user from removing the SIM card while the battery is inserted in the phone.

Moreover, to allow users to store audio and graphics on the phone, additional memory cards are often provided with the phones. It is desirable that these memory cards can easily be removed from the phones to be used in other electronic equipment such as PCs and photo printing devices. Typically, the memory cards are often located in slots with openings along the sides of the mobile phone. Consequently, it is often possible to remove the memory cards without first switching off the phone. Again, to prevent memory corruption, it is desirable to prevent the user from removing the memory cards while the phone is switched on.

SUMMARY OF THE INVENTION

The invention aims to address these and other issues.

According to the invention, there is provided a mobile device comprising a battery compartment for receiving a battery, a memory card slot for receiving a memory card, the memory card slot having an opening through which the memory card can be removed, a guard member movable from a first position in which it at least partly blocks the opening to the memory card slot to a second position in which the memory card can be removed from the memory card slot, wherein the battery compartment is arranged such that when the battery is inserted, the guard member is moved into the first position.

The guard member may comprise mechanically coupled first and second elements, at least part of the first element being located in the battery compartment and arranged to be mechanically engaged by the battery on insertion thereof and the second element arranged to block the opening to the memory card slot when the battery mechanically engages the first element.

Consequently, the invention provides a mechanism for preventing a user from removing the memory card from a mobile phone while the battery is in the phone. Since the mobile phone is switched off when the battery is not in the phone, the invention further provides a mechanism for preventing a user from removing the memory card when the phone is on.

The memory card can be provided either in the same plane as the battery or under the battery. When the memory card slot is provided in a plane adjacent a plane of the battery compartment, the second element may be a generally flat element transversely connected to the first element. When the memory card slot is provided in a same plane as the battery compartment, the second element may comprises a substantially flat piece connected to two transversely extending pieces for fitting on either side of a memory card.

The first element of the guard member may be pushed down towards a base of the battery compartment when the battery is inserted. Moreover, the guard member may be arranged such that, responsive to the battery being removed, stress in the guard member causes at least part of the first element to separate from the base of the battery compartment.

The first element may be formed from a metal plate and the stress in the element may be created by the plate having a slightly curved or bent shape. One end of the plate may be securely fastened to the base of the battery compartment. Additionally or alternatively, the first element may be connected to the base of the battery compartment with a spring.

BRIEF DESCRIPTION OF DRAWINGS

Embodiments of the invention will now be described by way of example, with reference to the accompanying drawings, in which:

FIG. 1 is a perspective view of a mobile device in a network in a first operational configuration;

FIG. 2 is a perspective view of the mobile device of FIG. 1 in another operational configuration;

FIG. 3 is a schematic diagram of circuitry for use in the device of FIGS. 1 and 2;

FIGS. 4a and 4b are views of the rear and the base of a mobile device having a memory card located in the same plane as the battery.

FIGS. 9a and 9b are views from the rear and the side of a mobile device having a memory card located under the battery;

FIGS. 10, 11 and 12 are cross-sectional views of the device of FIGS. 9a and 9b and illustrate the operation of a memory card guard member implemented in the device;

DETAILED DESCRIPTION

Figure 5:
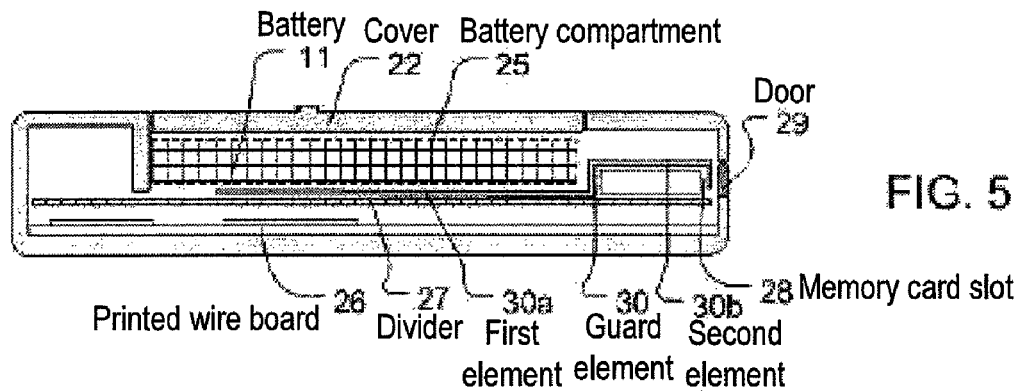
FIGS. 5 to 7 are cross-sectional views of the device of FIGS. 4a and 4b and illustrate the operation of a memory card guard member implemented in the device.

Referring to FIGS. 1 and 2, a mobile device in the form of a mobile telephone handset 1 includes an earpiece 2, a microphone 3, a keypad 4, with soft keys 5 which can be programmed to perform different functions, an LCD display 6 and an internal antenna (not shown). The body of the handset comprises a first and a second member 7, 8, the second member 8 being slidably attached to the first member 7. The handset can be opened into an extended operational configuration as shown in FIG. 1 by sliding the second member 8 downwards, away from the first member 7. In the contracted operational configuration, shown in FIG. 2, the second member 8 is slid into place behind the first member 7. The first member 7 includes the earpiece 2, the display 6 and the softkeys 5 and the second member 8 includes the keypad 4, additional softkeys 5 and the microphone 3. With reference to FIG. 1, the keypad can be accessed when the phone is in its extended operational configuration.

The second member houses a smart card, such as a GSM SIM card 9, and one or more additional memory cards, such as a multi-media card 10. Hereinafter, the phrase "memory card" should be understood to refer to both the smart card and the one or more additional memory cards. The second member also receives a removable battery 11 in a battery compartment. The memory cards 9, 10 and the battery 11 are located inside the second member 8 and can be removed through openings in the casing or by removing a piece of its casing. The memory cards can lie in the same plane as the battery. Alternatively, the memory cards can be provided under the battery. When the phone comprises more than one memory card, it is contemplated that some of the memory cards are located under the battery and some are provided in the same plane. How the memory cards and the battery are removed and inserted in the mobile phone will be described in more detail below.

The handset is operable to communicate through cellular radio links with one or more individual public land mobile networks (PLMNs) 12 based on technologies including but not limited to the TDMA and CDMA. For example, the network may use the GSM TDMA type signal protocol.

FIG. 3 illustrates the major circuit components of the handset 1. The circuit components are powered by the battery 11. Signal processing is carried out under the control of a digital microcontroller 13, which has an associated flash memory 14. Electrical analog audio signals are produced by microphone 3 and amplified by pre-amplifier 15. Similarly, analog audio signals are fed to the speaker 2 through an amplifier 16. The microcontroller 13 receives instruction signals from the keypad 4 and soft keys 5 and controls operation of the LCD display 6.

Information about the identity of the user is held on the smart card 9 which may be in the form of a GSM SIM card. The SIM card is removably received in a SIM card reader 17 connected to the microcontroller 13. Additional data such as music and picture files is stored on the multimedia card 10 removable received in a memory card reader 18. The memory card reader 18 is controlled by the microcontroller 13.

The handset circuitry includes a codec 19 and an rf stage 20 connected to an antenna 21. The codec 19 receives analog signals from the microphone amplifier 15, digitizes them into a GSM signal format and feeds them to the rf stage 20 for transmission through the antenna 21 to the network 12. Similarly, signals received from the network 12 are fed through the antenna 21 to be demodulated in the rf stage 20 and fed to codec 19, so as to produce analog signals fed to the amplifier 16 and earpiece 3.

The memory card removal guard will now be described in more detail. The memory card removal guard can be used with both the SIM card 9 and the multimedia card 10. The memory card removal guard will only be described with respect to a single memory card. However, it should be understood that multiple memory card removal guards could be used in the phone for multiple memory cards. The phone may comprise one removal guard member per each memory card. Alternatively, it may comprise one extended removal guard member per two or more memory cards.

An embodiment according to the invention of a guard member for a memory card lying in the same plane as a battery will now be described with reference to FIGS. 4 to 8. An embodiment of a guard member for a memory card located under a battery will then be described with reference to FIGS. 9 to 13.

Referring to FIGS. 4a and 4b, views of the rear and of the base of a mobile phone 1 having the memory card 9/10 and the battery 11 in the same plane are shown. Only the second member 8 of the mobile phone 1 is shown in FIGS. 4a and 4b. The rear of the second member 8 of the mobile phone 1 includes a cover 22 positioned over an opening in its casing 23. The battery 11 is located underneath the cover 22 within the second member 8, in a battery compartment described in more detail below. The base includes an opening 24 for inserting and removing the memory card 9/10. The memory card 9/10 inserted in the mobile phone is schematically shown in a hatched outline in FIG. 4a. The battery 11 inside the mobile phone is schematically shown in a hatched outline in FIG. 4b.

Figure 6:
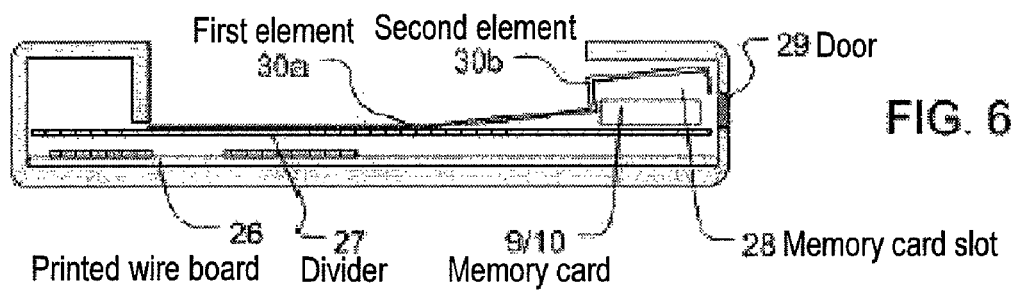
Figure 7:
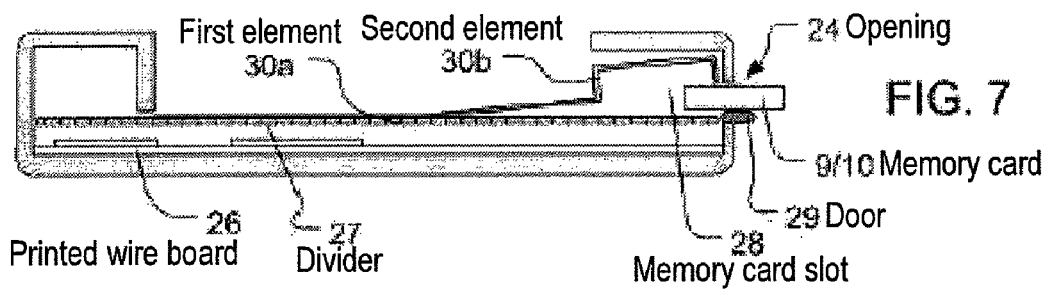

FIG. 5 shows a cross-section of the second member 8 of the mobile phone 1 of FIGS. 4a and 4b, along line AB, when the battery 11 and the memory card 9/10 are fully inserted. FIG. 6 shows the cross-section of the mobile phone when the battery 11 has been removed but the memory card 9/10 is fully inserted. FIG. 7 shows the cross section of the mobile phone when the battery 11 is removed and the memory card 9/10 is partly removed.

Referring now to FIG. 5, the battery compartment is referenced 25 and is separated from a Printed Wire Board (PWB) 26 in the mobile phone by a divider 27 defining the base of the battery compartment. The top of the battery compartment 25 is closed by the cover 22 and the battery 11 is positioned in the battery compartment. Mechanisms for securely holding the battery in the battery compartment are well known in the art and will not be described here. Adjacent the battery compartment 25, there is provided a memory card slot 28. The opening 24 to the memory card slot is covered by a door 29 attached to the casing of the mobile phone. The door may be made of rubber or other flexible material. The shape of the door allows it to be resiliently fitted in the opening 24.

Additionally, a memory card guard member 30 is provided to prevent a user from removing the memory card when the mobile phone is on. The memory card guard member is comprised of two elements, a first element 30a located in the battery compartment 25 and a second element 30b located in the memory card slot 28. The first element 30a is provided along the base of the battery compartment when the battery is fully inserted. The second element 30b provides a flange that fits over the memory card 9/10. The flange has a top piece arranged substantially planar to the first element and two side pieces arranged substantially perpendicular thereto. With reference to FIG. 5, the flat piece extends over the memory card such that the side pieces are positioned on either side of the card. One of the side pieces blocks the opening 24 to the slot 28 such that the memory card cannot be removed.

With reference to FIG. 6, when the battery is removed, stress in the guard member causes at least part of the first element 30a to lift from the base of the battery compartment 25. As a result, the second element of the member is also lifted and the opening 24 to the memory card slot 28 is unblocked. Consequently, the guard member acts as a spring, which when mechanically engaged by the battery closes the opening to the memory card slot. As shown in FIG. 7, when the battery is removed and the door 29 is opened, the memory card can be removed through the opening 24. However, if the door 29 had been opened when the battery was inserted as shown in FIG. 5, the second element 30*b* of the guard member 30 would have blocked the opening 24 and the memory card could not have been removed.

Starting from FIG. 7, if the memory card and the battery are now inserted again, the first element of the guard member will be pushed down towards the base of the battery compartment 25 by the battery 11, the side piece of the second element 30*b* will block the opening 24 to the memory card slot and the memory card will be trapped inside the mobile phone as shown in FIG. 5 until the battery is removed once more. Consequently, the guard member prevents a user from removing the memory card when the battery is powered.

Figure 8:
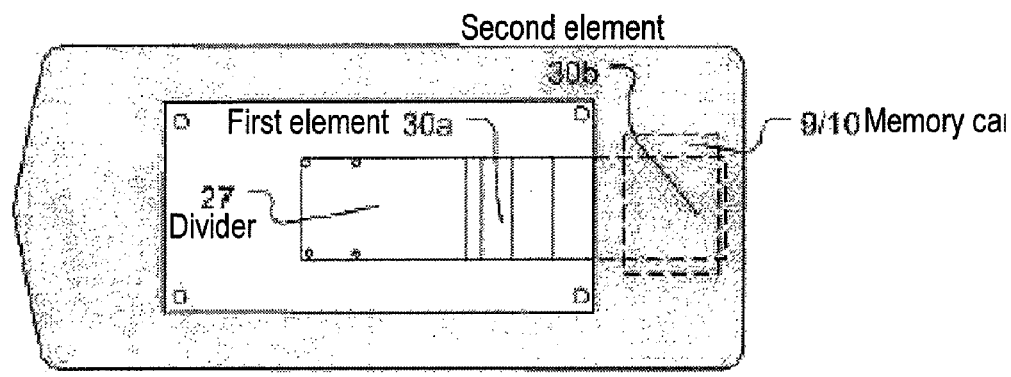
FIG. 8 is a rear view of the device of FIGS. 4 to 7 when the battery is removed.

The first and the second elements 30*a*, 30*b*, may be metal plates joined, for example, by welding. Alternatively, the first and the second elements may be formed from a single metal plate moulded or folded into a suitable shape. The stress in the metal plate may be caused by the first element 30*a* being slightly curved or bent and placed in the battery compartment such that the end of the metal plate closest to the second element bends away from the base of the compartment, as shown in FIGS. 6 and 7. Referring to FIG. 8, the first element 30*a* is attached to the base of the compartment by screws located away from the second element 30*b*. The screws keep the other end of the first element securely fastened to the base of the compartment. FIG. 8 shows a hatched outline of the extension of the metal plate outside the battery compartment 25 and the memory card inserted in the mobile phone.

Referring to FIGS. 9*a* and 9*b*, the memory card may be provided underneath the battery 11 rather than in the same plane. In FIGS. 9*a* and 9*b* only the second member 8 of the mobile phone 1 is shown. The rear of the mobile phone includes a cover 22 under which the battery 11 is located. The side of the second member 8 of the mobile phone 1 includes an opening 24' for inserting the memory card 9/10. The memory card 9/10 inside the mobile phone is shown with a hatched outline in FIG. 9*a*. The memory card 9/10 and the battery 11 inside the mobile phone are schematically shown with hatched outlines in FIG. 9*b*.

FIG. 10 shows a cross-sectional view of the mobile phone 1 of FIGS. 9*a* and 9*b*, along line DC, when the battery 11 and the memory card 9/10 are fully inserted. FIG. 11 shows a cross-section of the mobile phone when the battery 11 has been removed but the memory card 9/10 is fully inserted. FIG. 12 shows a cross section of the mobile phone when the battery 11 is removed and the memory card 9/10 is partly removed.

With reference to FIG. 10, a battery compartment 25' is separated from a PWB 26 by a divider 27. A memory card slot 28 is provided in a plane between the plane of the divider 27 and the PWB 26. A guard member 30' comprising a first element 30*a*', at least partly located in the battery compartment 25, and a second element 30*b*', located in the memory card slot 28, is provided to prevent the memory card from being removed when the mobile phone is on. The second element of the guard member includes a tip transversely connected to the first element which blocks the opening 24 to the memory card slot 28 when the battery is inserted.

The first element 30*a*' may be formed from metal and is slightly curved or bent such that the stress in the metal causes at least part of the first element to separate from the base of the battery compartment 25 when the battery 11 is removed as shown in FIG. 11. As a result of the separation between the first element and the base of the battery, the second element 30*b*' unblocks the opening 24 to the memory card slot 28. Referring to FIG. 12, opening the door 29 to the memory card slot 28 now allows the user to remove the memory card 9/10 from the mobile phone 1.

However, if the door 29 had been opened when the battery was inserted as shown in FIG. 10, the guard member would have blocked the opening 24 and, therefore, the memory card 9/10 could not have been removed. Starting from FIG. 12, if the process is now reversed and the memory card and the battery are inserted again, the guard member 30' will be depressed by the battery 11 as shown in FIG. 10, thereby securely locking the memory card 9/10 inside the mobile phone 1 as long as the battery is inserted.

Figure 13:
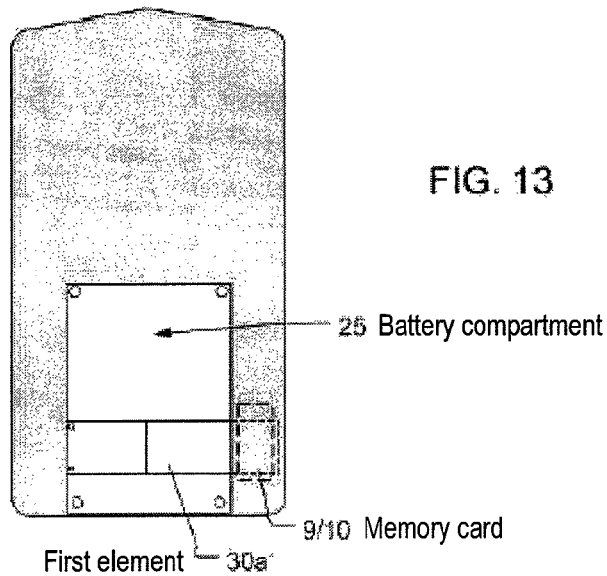
FIG. 13 is a rear view of the device of FIGS. 9 to 12 when the battery is removed.

With reference to FIG. 13, the first element 30*a*' of the guard member is securely fastened to the base of the battery compartment 25 with screws. The hatched outline shows the extension of the first element 30*a*' extending over the memory card 9/10.

Figure 14:
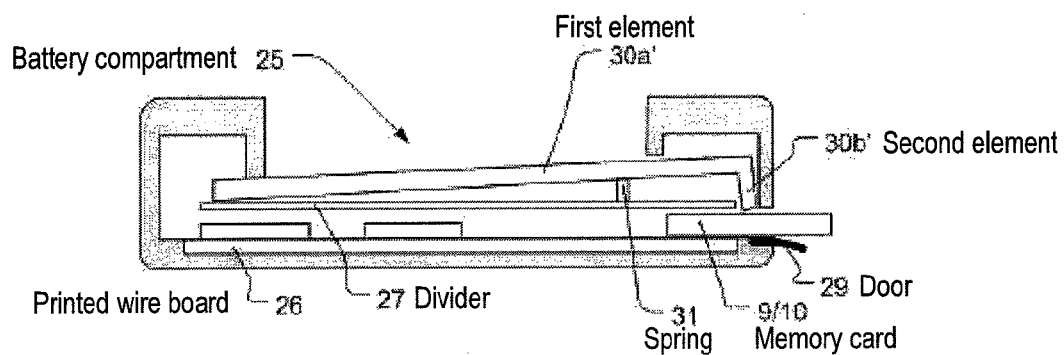
FIG. 14 to 17 are enlarged views of additional example of memory card guard members for a mobile device having a memory card located under a battery.
Figure 15:
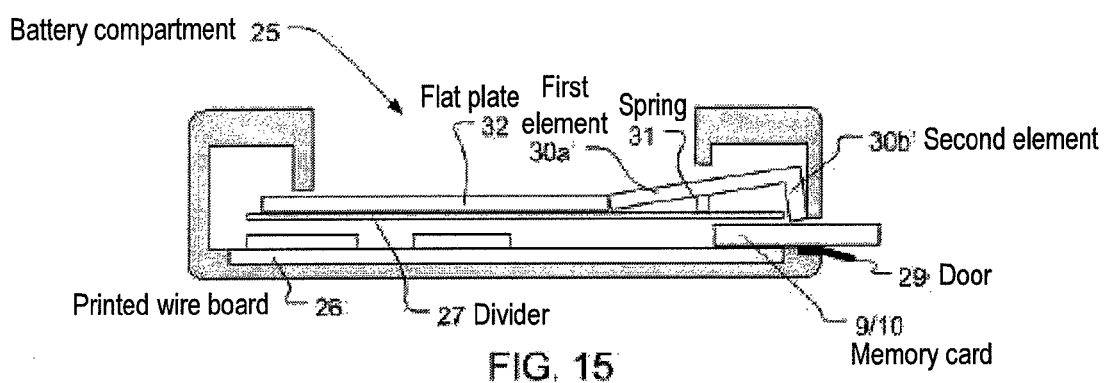

Referring now to FIG. 14, various modifications and variations to the embodiments of the guard member 30' are possible. For example, instead of the first element 30*a*' of the guard member having a bent shape, it can be flat and a spring 31 can be provided between the first element and the base of the battery compartment near the second element to push the guard member away from the base when the battery is removed. Moreover, the guard member does not necessarily have to run the whole length of the battery compartment. With reference to FIG. 15, the first element 30*a*' may be attached with a hinge along one side of the element to a flat plate 32 in the battery compartment 25 and the spring 31 may be used to incline the first element at an angle with respect to the plate 32 and the base of the compartment.

Figure 16:
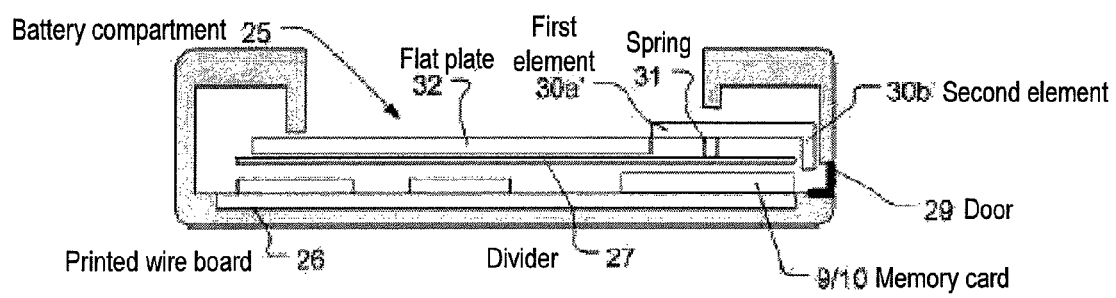
Figure 17:
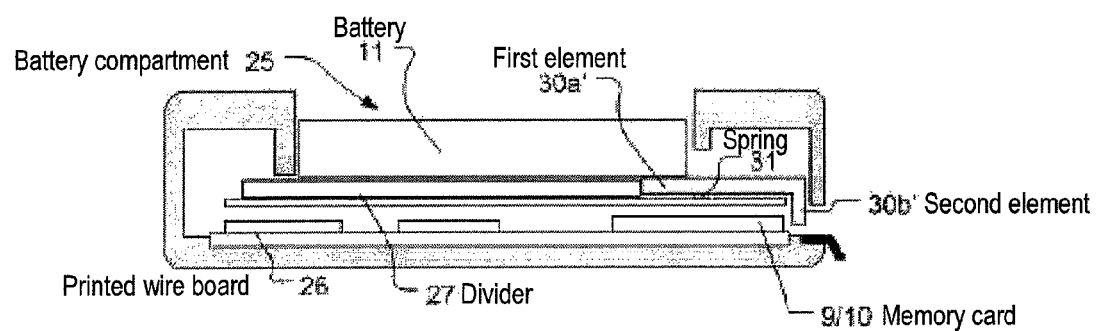

Additionally, with respect to FIG. 16, the first element 30*a*' and the plate 32 along the base of the battery compartment do not necessarily have to be coupled. The first element can be provided along one side of the battery compartment and be pushed down against the tension of a spring 31, upon insertion of the battery, as shown in FIG. 17.

It will be understood that while the guard member 30, 30' has been described and illustrated with respect to the drawings, these are merely specific examples of the invention, and modifications and variations are possible. For example, the modifications described in FIGS. 14 to 17, with respect to a device having a memory card slot located in a plane adjacent to the plane of the battery compartment, can also be applied to a guard member implemented in a device in which the memory card slot is provided in the same plane as the battery compartment.

Moreover, the opening 24 to the memory card slot 28 has been described to be provided at the base of the mobile phone in a mobile having the memory card slot in the same plane as the battery compartment and in the side of the mobile phone in a mobile having the memory card slot located in a plane adjacent the plane of the battery compartment. However, it should be understood that the opening to the memory card slot could be provided in any suitable location.

Moreover, although the battery compartment and the PWB have been described to be separated by a divider, it should be understood that the guard member itself can act as the divider and no separate divider is needed. A plate dividing the battery compartment and the PWB is typically used in mobile phones anyway. Consequently, the design of the plate separating the battery compartment and memory card slot can be modified to incorporate the invention.

A person skilled in the art should further recognise that although the memory cards and the battery are described to be located in the second member 8 of the mobile phone, the memory cards 9/10 and the battery 11 could also be located in the first member 7. Moreover, although the phone has been described to include a SIM card and one or more additional memory cards, the phone may comprise only one SIM card and no memory cards or only one memory card.

Furthermore, the mobile phone of FIG. 1 and FIG. 2 is only one example of a mobile phone and it should be clear that the invention could also be implemented in other types of mobile phones. For example, another mobile phone may only have one body member or be a flip phone. Additionally, although the invention has been described with respect to a mobile phone, the invention could be implemented in any mobile device driven by a removable battery and including one or more removable memory cards.

The invention claimed is:

1. An apparatus comprising:
a battery compartment having a substantially planar base, for receiving a battery;
a memory card slot for receiving a memory card, the memory card slot having an opening through which the memory card can be removed along a plane substantially parallel with said planar base of the battery compartment; and
a guard member movable from a first position in which it at least partly blocks the removal of the memory card along the plane through the opening to the memory card slot to a second position in which the memory card can be removed along said plane from the memory card slot, wherein the battery compartment is arranged such that when the battery is inserted, the guard member is moved into the first position in response to the insertion of the battery, thereby preventing the memory card from being removed along said plane without first removing the battery.

2. An apparatus according to claim 1, wherein the guard member comprises mechanically coupled first and second elements, at least part of the first element being located in the battery compartment and arranged to be mechanically engaged by the battery on insertion thereof and the second element arranged to block the opening to the memory card slot when the battery mechanically engages the first element.

3. An apparatus according to claim 2, wherein the memory card slot is provided in a plane adjacent a plane of the battery compartment, the first element extends outside the battery compartment into the memory card slot and the second element is a generally flat element transversely connected to the first element.

4. An apparatus according to claim 2, wherein the memory card slot is provided in a same plane as the battery compartment and the second element comprises a substantially flat piece connected to two transversely extending pieces for fitting on either side of a memory card.

5. An apparatus according to claim 1, wherein the first element of the guard member is pushed down towards the base of the battery compartment when the battery is inserted.

6. An apparatus according to claim 5 wherein the guard member is arranged such that responsive to the battery being removed, stress in the guard member causes at least part of the first element to separate from the base of the battery compartment.

7. An apparatus according to claim 5, wherein the first member is formed of a curved metal plate having a first end securely fastened to the base of the battery compartment.

8. An apparatus according to claim 6, wherein the first element is formed of a metal plate having a first edge and a second edge, the metal plate being shaped such that the first edge of the plate bends away from the base of the battery compartment when arranged therein.

9. An apparatus according to claim 8, wherein the second edge is securely fastened to the base of the battery compartment.

10. An apparatus according to claim 6, wherein the at least part of the first element is located at an angle to the plane of the base of the battery compartment when the battery is removed.

11. An apparatus according to claim 6, wherein the first element of the guard member comprises a metal plate hinged along one side to the base of the battery compartment.

12. An apparatus according to 6, wherein the first element is connected to the base of the battery compartment with a resilient element.

13. An apparatus, according to claim 12, wherein the resilient element is a spring.

14. An apparatus according to claim 1, wherein the apparatus has a rear cover and two sides, an opening to the battery compartment is provided in the rear cover and said opening to the memory card slot is provided along one side.

15. An apparatus according to claim 1, wherein the apparatus has a rear cover and the base, an opening to the battery compartment is provided in the rear cover and said opening to the memory card slot is provided along the base of the device.

16. An apparatus according to claim 1, wherein the apparatus comprises a cellular phone.

17. An apparatus according to claim 1, wherein the memory card is a smart card.

18. An apparatus according to claim 17, configured to operate according to the GSM standard and wherein the smart card comprises a SIM card.

19. An apparatus according to claim 1, wherein the memory card is a multimedia card.

20. An apparatus according to claim 1, wherein the memory card is a memory stick.

21. An apparatus comprising:
a memory card slot defining a plane, having an opening for removably receiving a memory card along the card slot plane; and
a mechanism for preventing said memory card from being removed along the card slot plane when the apparatus is on, the mechanism comprising a first element arranged to be engaged by a battery upon insertion thereof into a battery compartment in the apparatus, the battery compartment having a substantially planar base substantially parallel with the card slot plane and a second element mechanically coupled to the first element and arranged to block removal of the memory card along the card slot plane through the opening to the memory card slot in response to the engagement between the first element and the battery, thereby preventing the memory card from being removed along the card slot plane without first removing the battery.

22. An apparatus according to claim 21 comprising the first element being at least partly located in the battery compartment, and the mechanism being arranged such that, responsive to the battery being inserted into the battery compartment, the first element is pushed down towards said base.

23. An apparatus according to claim 22, wherein the memory card slot is provided in a plane adjacent to the plane of the battery compartment and the second element is a generally flat element transversely connected to the first element.

24. An apparatus according to claim 22, wherein the memory card slot is provided in a same plane as the battery compartment and the second element is hook-shaped.

25. An apparatus according to claim 21, wherein the memory card is a SIM card.

26. An apparatus according to claim 21, wherein the apparatus comprises a mobile phone.

27. An apparatus comprising:
- a battery compartment for removably receiving a battery, the battery compartment having a substantially planar base provided substantially parallel to a printed wire board (PWB);
- a memory card slot located between the base of the battery compartment and the PWB for removably receiving a memory card along a plane substantially parallel with said planar base of the battery compartment;
- a casing enclosing the battery compartment and the memory card slot;
- an opening to the memory card slot located in the casing of the apparatus; and
- a member located in the battery compartment at a distance from the base and arranged to be pushed down towards the base in response to insertion of the battery, the member being transversely connected to a door blocking said opening to the memory card compartment in the casing, the door blocking removal of the memory card along the plane through the opening in response to the member being pushed down towards the base of the battery compartment, thereby preventing the memory card from being removed along said plane without first removing the battery.

28. An apparatus comprising:
- a battery compartment for removably receiving a battery, the battery compartment having a substantially planar base provided substantially parallel to a printed wire board;
- a memory card slot provided adjacent the battery compartment with respect to a longitudinal direction of the apparatus for removably receiving a memory card in a plane substantially parallel with said planar base of the battery compartment;
- a casing enclosing the battery compartment and the memory card slot:
- an opening to the memory card slot provided in the casing; and
- a first member located in the battery compartment at a distance from the base and arranged to be pushed down towards the base in response to insertion of the battery, the first member being connected to a hook-shaped member arranged to fit over the memory card and block the opening to the memory card compartment, the hook-shaped member blocking removal of the memory card along the plane through the opening in response to the first member being pushed down towards the base of the battery compartment, thereby preventing the memory card from being removed along said plane without first removing the battery.

29. An apparatus according to claim 27, wherein the apparatus comprises a mobile phone.

30. An apparatus according to claim 28, wherein the apparatus comprises a mobile phone.

* * * * *